US008429930B2

(12) United States Patent
Valiya Naduvath et al.

(10) Patent No.: US 8,429,930 B2
(45) Date of Patent: Apr. 30, 2013

(54) OIL SEPARATOR

(75) Inventors: Mahesh Valiya Naduvath, Lutherville, MD (US); Jun Wang, Clarksville, TN (US); Satheesh Kulankara, York, PA (US)

(73) Assignee: Johnson Controls Technology Company, Holland, MI (US)

( * ) Notice: Subject to any disclaimer, the term of this patent is extended or adjusted under 35 U.S.C. 154(b) by 480 days.

(21) Appl. No.: 12/667,233

(22) PCT Filed: Jul. 11, 2008

(86) PCT No.: PCT/US2008/069777
§ 371 (c)(1),
(2), (4) Date: Oct. 4, 2010

(87) PCT Pub. No.: WO2009/009728
PCT Pub. Date: Jan. 15, 2009

(65) Prior Publication Data
US 2011/0011105 A1     Jan. 20, 2011

Related U.S. Application Data

(60) Provisional application No. 60/949,294, filed on Jul. 12, 2007.

(51) Int. Cl.
F25B 43/02 (2006.01)
(52) U.S. Cl.
USPC ............................................. 62/468; 62/470

(58) Field of Classification Search .............. 62/84, 468, 62/470, 498
See application file for complete search history.

(56) References Cited

U.S. PATENT DOCUMENTS

| | | | | |
|---|---|---|---|---|
| 3,504,804 A * | 4/1970 | Arnold et al. | ............... | 210/512.1 |
| 4,227,316 A * | 10/1980 | Schneider | ........................ | 34/618 |
| 4,559,068 A * | 12/1985 | Lagerstedt et al. | ............. | 55/399 |
| 5,022,834 A * | 6/1991 | Etemad et al. | ................ | 418/55.1 |
| 6,129,775 A * | 10/2000 | Conrad et al. | ................... | 55/337 |
| 6,318,980 B1 * | 11/2001 | Kurihara et al. | ............... | 417/571 |
| 6,475,256 B2 * | 11/2002 | Matsubara et al. | ............. | 55/337 |
| 6,497,114 B1 * | 12/2002 | Strikis et al. | ..................... | 62/473 |
| 6,574,986 B2 * | 6/2003 | Morimoto et al. | ............... | 62/470 |
| 6,959,557 B2 * | 11/2005 | Manole et al. | ................... | 62/149 |
| 7,386,994 B2 * | 6/2008 | Chang et al. | .................... | 62/470 |
| 2002/0100291 A1* | 8/2002 | Strikis et al. | ..................... | 62/470 |
| 2002/0134102 A1* | 9/2002 | Morimoto et al. | ............... | 62/470 |

* cited by examiner

Primary Examiner — Mohammad M Ali
(74) Attorney, Agent, or Firm — McNees Wallace & Nurick LLC

(57) ABSTRACT

An oil separator for use in separating oil from refrigerant gas in a chiller system is provided. Its operation is based on centrifugal separation principles and does not require the use any type of filter or media pack to remove oil from refrigerant gas. The oil separator includes a non-circular (e.g., elliptical) refrigerant outlet pipe that transitions the linear flow from the inlet connection to a swirling (e.g., circular) flow within the cylindrical housing. The non-circular shape of the entrance to the refrigerant outlet pipe provides for more turbulent gas flow and a greater extraction of oil as well as minimization of pressure losses.

22 Claims, 5 Drawing Sheets

OIL SEPARATOR

CROSS-REFERENCES TO RELATED PATENT APPLICATIONS

This application claims the benefit of U.S. Provisional Application No. 60/949,294, entitled OIL SEPARATOR, filed Jul. 12, 2007, which is hereby incorporated by reference.

BACKGROUND

This application generally relates to an oil separator for separating oil from refrigerant gas in a chiller system. This application relates more specifically to a cylindrical oil separator for a chiller system having a non-circular outlet pipe located in the cylinder.

In general, a refrigeration, air conditioning, or chiller system has a compressor to compress a refrigerant gas, a condenser to condense the compressed gas to a refrigerant liquid, an expansion valve to reduce the pressure of the refrigerant liquid, and an evaporator to evaporate the refrigerant liquid by absorbing heat from a fluid, which fluid is then chilled to provide refrigeration or air conditioning capacity. There are various types of compressors used in a chiller system, such as screw, reciprocating, centrifugal, and scroll compressors. Typically, a compressor uses lubricant, such as oil, to lubricate and to provide better sealing performance between mating parts in certain types of compressors, such as screw compressors. Inevitably, oil used in a compressor becomes mixed with refrigerant gas, and a mixture of oil and refrigerant gas is carried from the compressor to the condenser and evaporator.

However, oil does not have favorable heat-transfer characteristics, and oil that has traveled into the condenser and the evaporator reduces the efficiency of a chiller system. Furthermore, if oil that has traveled from the compressor to the other parts of the chiller system is not returned to the compressor, more oil must be added to the chiller system to maintain the compressor performance, or the lack of oil may cause the compressor to fail. In large chiller systems, several gallons of oil per minute may be required to circulate with compressed refrigerant gas in the compressor to lubricate and seal compressor components.

In an effort to alleviate these problems, an oil separator is often employed between a compressor and a condenser in a chiller system. An oil separator separates the oil from the refrigerant gas in an oil and refrigerant gas mixture from the compressor. The oil separator discharges the refrigerant gas to the condenser and returns the separated oil to the compressor.

Intended advantages of oil separator systems and/or methods disclosed herein satisfy one or more needs or provide other advantageous features. Other features and advantages will be made apparent from the present specification, the teachings of which extend to those embodiments that fall within the scope of the claims, regardless of whether they accomplish one or more of the aforementioned needs.

SUMMARY

In one embodiment an oil separator is provided for separating oil from a compressed gas and oil mixture. The oil separator includes a cylindrical housing. The cylindrical housing includes a first portion, a second portion disposed below the first portion, at least one inlet connection configured to receive the compressed gas and oil mixture, and at least one outlet connection configured to discharge a compressed gas with substantially all of the oil removed. The outlet connection is in fluid communication with a non-circular outlet external pipe. The outlet external pipe extends from within the first portion and passing through the top portion. The outlet external pipe extends into the cylindrical housing below the inlet connection. The inlet connection is disposed in the first portion approximately tangent to an inner wall of the cylindrical housing. The inlet connection is in fluid communication with a discharge line of a compressor, the inlet connection configured to direct fluid tangentially in the cylindrical housing toward a first axis of the non-circular outlet external pipe. The second portion includes an oil reservoir configured to contain oil separated from the gas and oil mixture.

In another embodiment, a chiller system includes a compressor, a condenser and an evaporator connected in a closed refrigerant loop, and an oil separator that is provided for separating oil from a compressed gas and oil mixture. The oil separator includes a cylindrical housing. The cylindrical housing includes a first portion, a second portion disposed below the first portion, at least one inlet connection configured to receive the compressed gas and oil mixture, and at least one outlet connection configured to discharge a compressed gas with substantially all of the oil removed. The outlet connection is in fluid communication with a non-circular outlet external pipe. The outlet external pipe extends from within the first portion and passing through the top portion. The outlet external pipe extends into the cylindrical housing below the inlet connection. The inlet connection is disposed in the first portion approximately tangent to an inner wall of the cylindrical housing. The inlet connection is in fluid communication with a discharge line of a compressor, the inlet connection configured to direct fluid tangentially in the cylindrical housing toward a first axis of the non-circular outlet external pipe. The second portion includes an oil reservoir configured to contain oil separated from the gas and oil mixture.

In still another embodiment, there is provided a method of separating a lubricant from a mixture formed by a gas and the lubricant in a chiller system. The method includes introducing a flow of the lubricant and gas mixture tangentially into a cylindrical housing; separating lubricant from the mixture by centrifugal force; separating lubricant from the mixture by changing a flow direction of the mixture in the cylindrical housing; discharging gas from the cylindrical housing; and discharging lubricant separated from the lubricant and gas mixture from the cylindrical housing.

Alternative exemplary embodiments relate to other features and combinations of features as may be generally recited in the claims.

DETAILED DESCRIPTION OF THE EXEMPLARY EMBODIMENTS

In a Heating, Ventilating, Air Conditioning system (HVAC system), a compressor uses lubricant such as oil, including oil blended with preselected additives for desired properties, collectively referred to as oil—to lubricate the compressor and provide better sealing performance between the moving components of the compressor. During operation of the compressor, the oil may become mixed with refrigerant gas. A mixture of oil and refrigerant gas can be carried from the compressor to a condenser and evaporator. An oil separator is employed between the compressor and the condenser in a chiller system in order to separate the oil from the oil and refrigerant gas mixture. The oil separator then discharges refrigerant gas to the condenser and returns separated oil to the compressor.

As described in detail below, an oil separator is provided for use in separating oil from refrigerant gas in a chiller system. The oil separator operates based on centrifugal separation principles and does not require the use any type of filter or media pack to remove oil from refrigerant gas. The oil separator includes a non-circular (for example, elliptical) refrigerant outlet pipe that transitions the linear flow from the inlet connection to a swirling (for example, circular) flow within the cylindrical housing. The non-circular shape of the entrance to the refrigerant outlet pipe provides for more turbulent gas flow and a greater extraction of oil.

Figure 1:
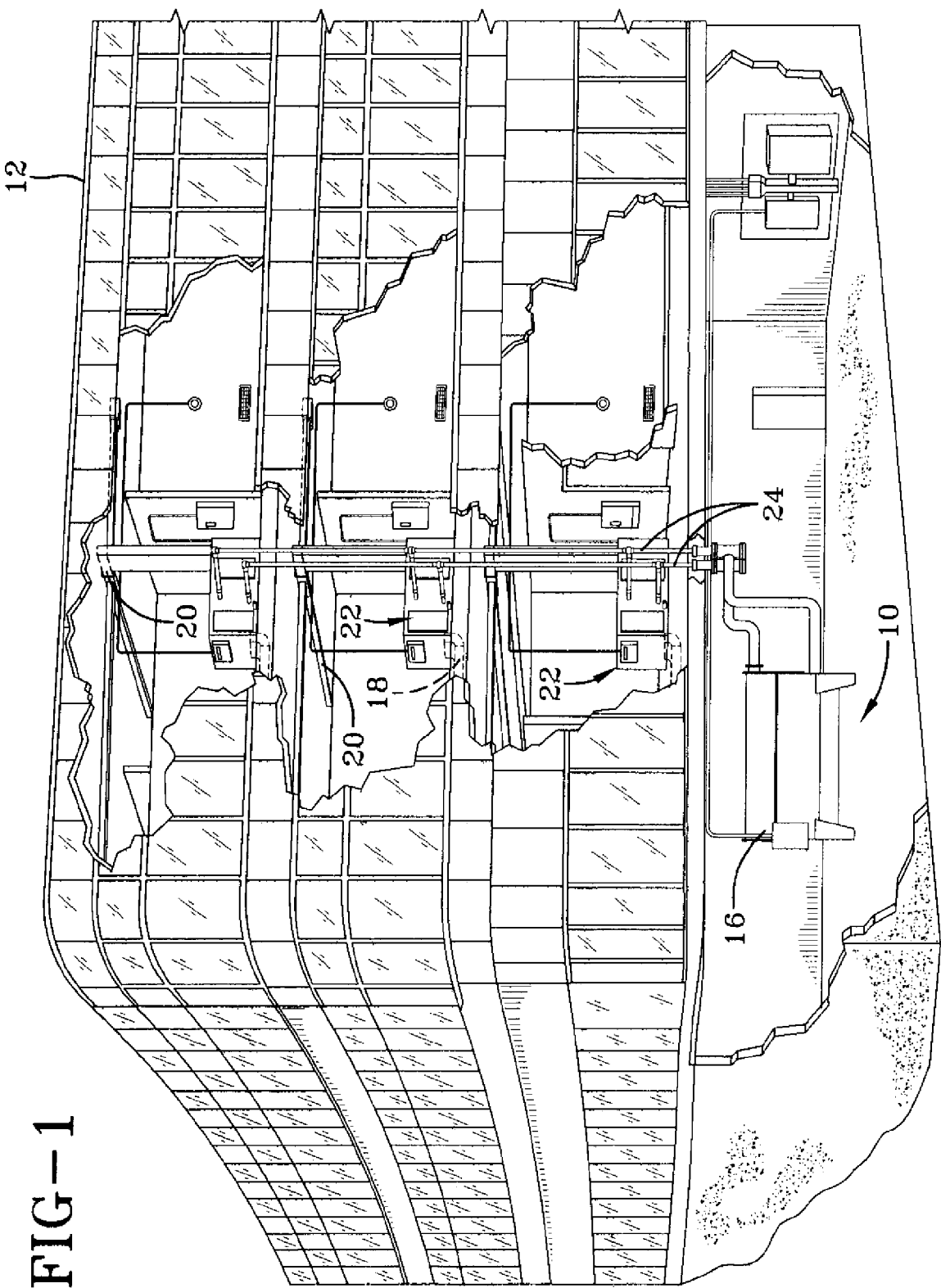
FIG. 1 shows an exemplary embodiment of a Heating, Ventilation, Air Conditioning and Refrigeration (HVAC&R) system in a commercial environment.

Referring to FIG. 1, an exemplary environment for an HVAC system 10 in a building 12 for a typical commercial setting is shown. System 10 may include a compressor (not shown) incorporated into a chiller 16 that can supply a chilled liquid that may be used to cool building 12. In one embodiment, compressor 38 may be a screw compressor 38 (see for example, FIG. 2). In other embodiments compressor 38 may be a centrifugal compressor or reciprocal compressor (not shown). System 10 includes an air distribution system that circulates air through building 12. The air distribution system can include an air return duct 18, an air supply duct 20 and an air handler 22. Air handler 22 can include a heat exchanger (not shown) that is connected to a boiler (not shown) and chiller 16 by conduits 24. Air handler 22 may receive either heated liquid from the boiler or chilled liquid from chiller 16 depending on the mode of operation of HVAC system 10. HVAC system 10 is shown with a separate air handler on each floor of building 12, but it will be appreciated that these components may be shared between or among floors. In another embodiment, the system 10 may include an air-cooled chiller that employs air-cooled coil as a condenser. An air-cooled chiller may be located on the exterior of the building—for example, adjacent to or on the roof of the building.

Figure 2:
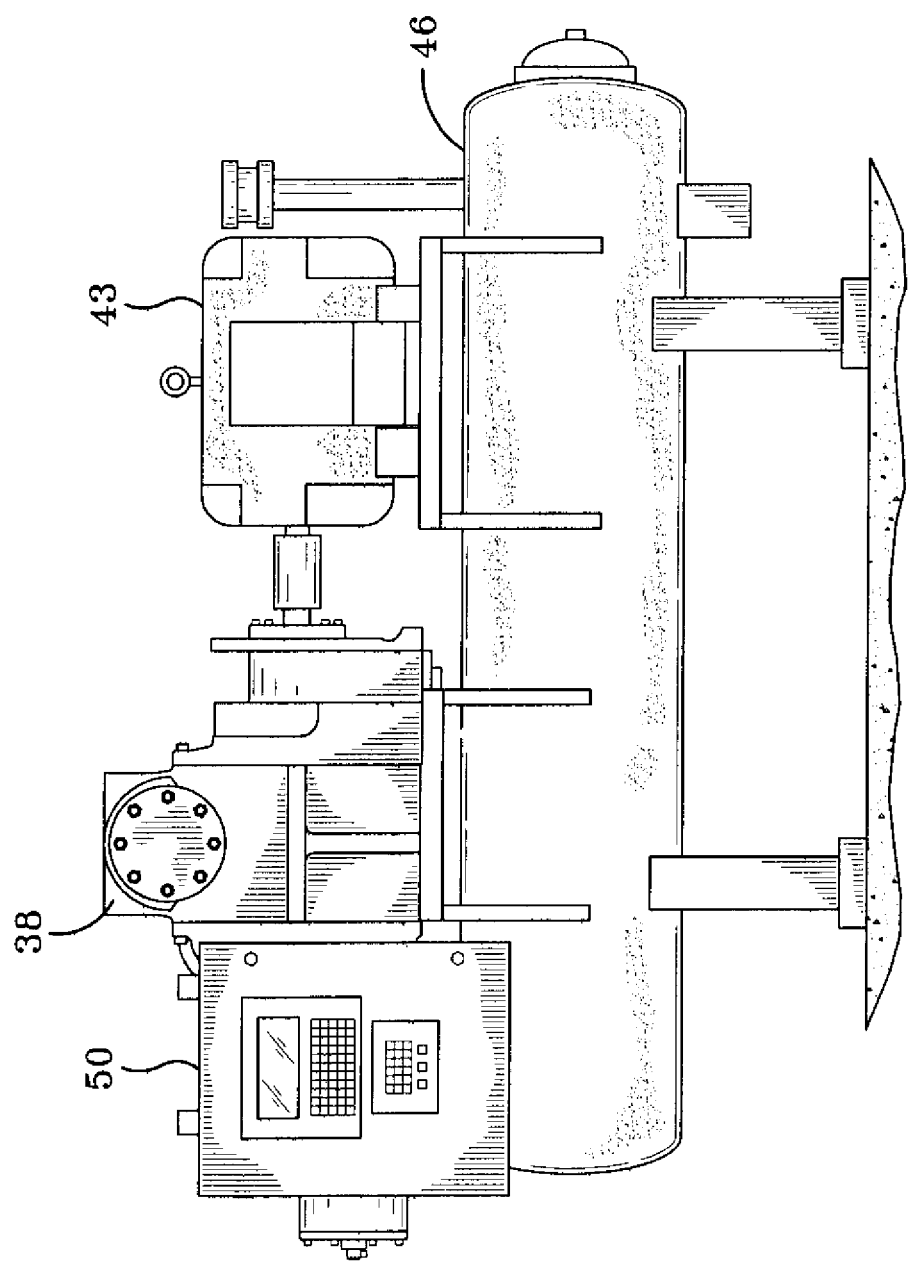
FIG. 2 shows an exemplary embodiment of a compressor unit of a Heating, Ventilation, Air Conditioning and Refrigeration (HVAC&R) system.

FIG. 2 shows an exemplary embodiment of a screw compressor in a packaged unit for use with chiller 16. The packaged unit includes a screw compressor 38, a motor 43 to drive screw compressor 38, a control panel 50 to provide control instructions to equipment included in the packaged unit, such as motor 43. An oil separator 46 can be provided to remove entrained oil (used to lubricate the rotors of screw compressor 38) from the discharge vapor before providing the discharge vapor to its intended application.

Figure 3:
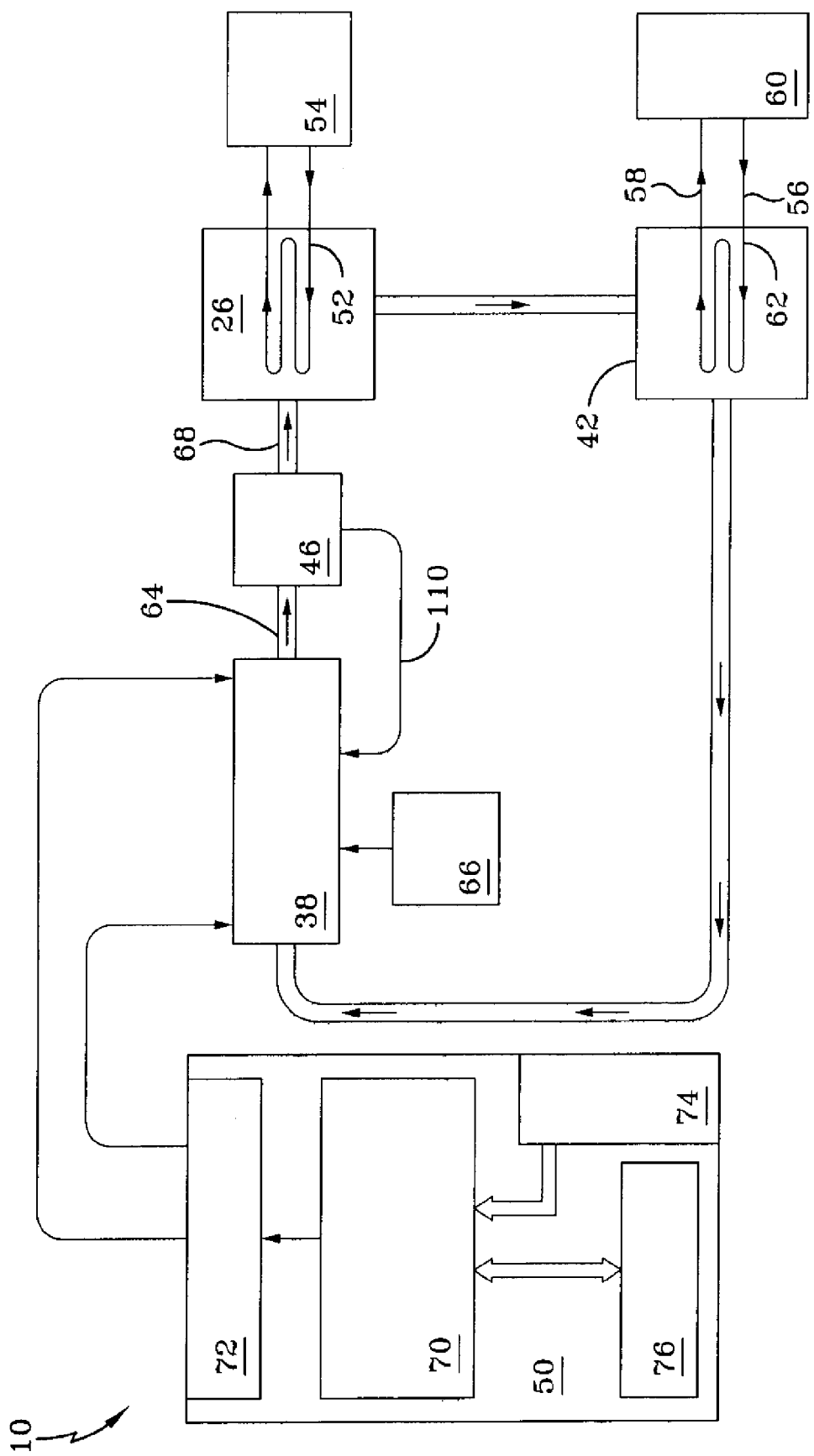
FIG. 3 is a schematic illustration of exemplary components of a refrigeration system, including an oil separator.

FIG. 3 shows an exemplary HVAC&R or liquid chiller system 10, which includes compressor 38, condenser 26, water chiller or evaporator 42, and a control panel 50. Control panel 50 may include a microprocessor 70, an interface board 72, an analog-to-digital (A to D) converter 74, and/or a non-volatile memory 76. Control panel 50 may be positioned or disposed locally and/or remotely to system 10. Control panel 50 receives input signals from system 10. For example, temperature and pressure measurements indicating the performance of system 10. The signals are transmitted to components of system 10, for example, a compressor capacity control signal, to control the operation of system 10. Conventional liquid chiller or HVAC&R system 10 may include other features that are not shown in FIG. 3 and have been purposely omitted to simplify the drawing for ease of illustration. While the following description of system 10 is in terms of a liquid chiller system, it is to be understood that the invention could be applied to any refrigeration system or any HVAC&R system.

Compressor 38 compresses a refrigerant vapor and delivers the vapor to condenser 26 through a discharge line 68. Compressor 38 may be any suitable type of compressor including screw compressor, reciprocating compressor, scroll compressor, rotary compressor or other type of compressor. System 10 may have more than one compressor 38 connected in one or more refrigerant circuits.

Refrigerant vapor delivered to condenser 26 enters into a heat exchange relationship with a fluid, for example, air or water, and undergoes a phase change to a refrigerant liquid as a result of the heat exchange relationship with the fluid. The condensed liquid refrigerant from condenser 26 flows to evaporator 42. Refrigerant vapor in condenser 26 enters into the heat exchange relationship with water, flowing through a heat exchanger coil 52 connected to a cooling tower 54. Alternatively, the refrigerant vapor is condensed in a coil with heat exchange relationship with air blowing across the coil. The refrigerant vapor in condenser 26 undergoes a phase change to a refrigerant liquid as a result of the heat exchange relationship with the water or air in heat exchanger coil 52.

Evaporator 42 may include a heat exchanger coil 62 having a supply line 56 and a return line 58 connected to a cooling load 60. Heat exchanger coil 62 can include a plurality of tube bundles within evaporator 42. A secondary liquid, for example, water, ethylene, calcium chloride brine, sodium chloride brine, or any other suitable secondary liquid travels into evaporator 42 via return line 58 and exits evaporator 42 via supply line 56. The liquid refrigerant in evaporator 42 enters into a heat exchange relationship with the secondary liquid in heat exchanger coil 62 to chill the temperature of the secondary liquid in heat exchanger coil 62. The refrigerant liquid in evaporator 42 undergoes a phase change to a refrigerant vapor as a result of the heat exchange relationship with the secondary liquid in heat exchanger coil 62. The vapor refrigerant in evaporator 42 exits evaporator 42 and returns to compressor 38 by a suction line to complete the cycle. While system 10 has been described in terms of condenser 26 and evaporator 42, any suitable configuration of condenser 26 and evaporator 42 can be used in system 10, provided that the appropriate phase change of the refrigerant in condenser 26 and evaporator 42 is obtained.

In one embodiment, chiller system capacity may be controlled by adjusting the speed of a compressor motor driving compressor 38, using a variable speed drive (VSD).

To drive compressor 38, system 10 includes a motor or drive mechanism 66 for compressor 38. While the term "motor" is used with respect to the drive mechanism for compressor 38, the term "motor" is not limited to a motor, but may encompass any component that may be used in conjunction with the driving of compressor 38, such as a variable speed drive and a motor starter. Motor or drive mechanism 66 may be an electric motor and associated components. Other drive mechanisms, such as steam or gas turbines or engines and associated components may be used to drive compressor 38.

The control panel executes a control system that uses a control algorithm or multiple control algorithms or software to control operation of system 10 and to determine and implement an operating configuration for the inverters of a VSD (not shown) to control the capacity of compressor 38 or multiple compressors in response to a particular output capacity requirement for system 10. The control algorithm or multiple control algorithms may be computer programs or software stored in non-volatile memory 76 of control panel 50 and may include a series of instructions executable by microprocessor 70. The control algorithm may be embodied in a computer program or multiple computer programs and may be executed by microprocessor 70, the control algorithm may be implemented and executed using digital and/or analog hardware (not shown). If hardware is used to execute the control algorithm, the corresponding configuration of control panel 50 may be changed to incorporate the necessary components and to remove any components that may no longer be required.

Chiller system 10, as illustrated in FIG. 3, includes compressor 38 in fluid communication with an oil separator 46. An oil and refrigerant gas mixture travels along discharge pipe 64 from compressor 38 to oil separator 46. Compressor 38 is in fluid communication with oil separator 46 via oil return line 110. Condenser 26 is provided in fluid communication with oil separator 46, and refrigerant gas travels from oil separator 46 to condenser 26. At condenser 26, refrigerant gas is cooled and condensed into a refrigerant liquid, which is in turn transmitted to evaporator 42 through expansion valve 61. At evaporator 42, heat transfer takes place between the refrigerant liquid and a second fluid that is cooled to provide desired refrigeration. The refrigerant liquid in evaporator 42 is converted into a refrigerant gas by absorbing heat from the chilled liquid and returns to compressor 38. This refrigeration cycle continues when the chiller system is in operation.

Figure 6:
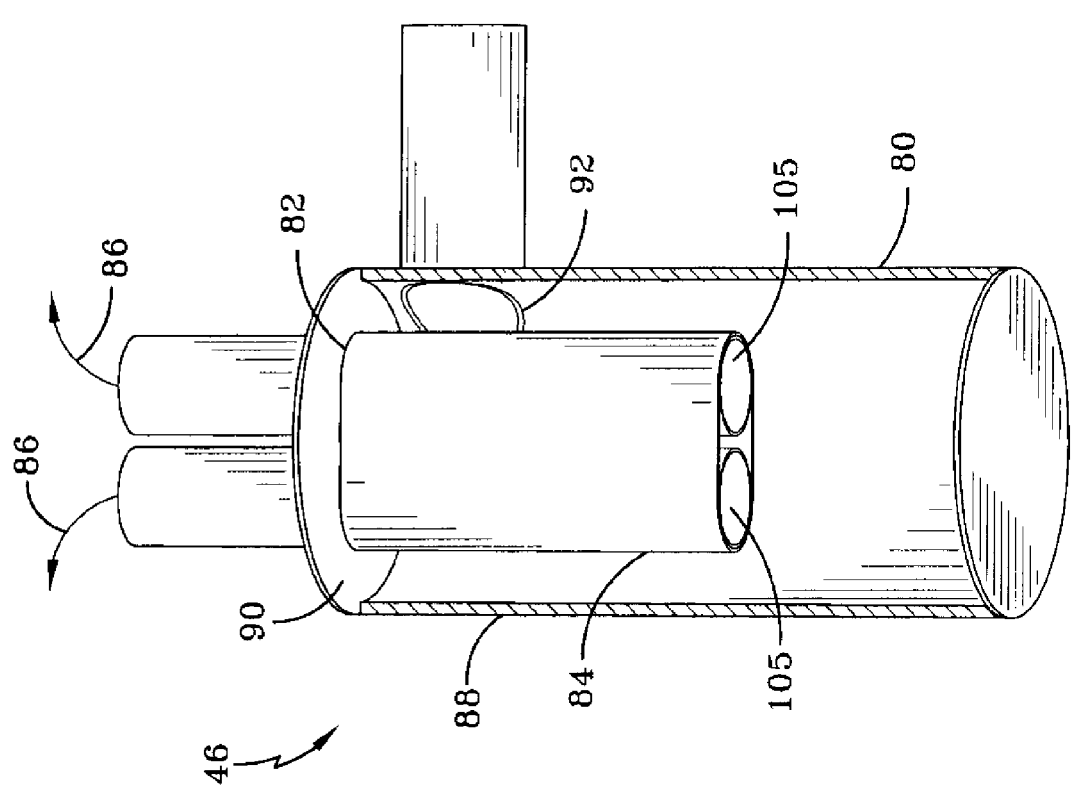
FIG. 6 is a schematic illustration of a cut-away view of an exemplary oil separator.

FIG. 6 shows an exemplary oil separator 46 having a cylindrical housing 80, which may have one or more inlet connections and one or more outlet connections. A refrigerant outlet connection 82, where refrigerant gas 86 exits (shown in FIG. 4), is formed by a non-circular refrigerant outlet pipe 84 (for example, a pipe having an elliptical cross-section) that extends from within upper portion 88 of cylindrical housing 80 and passing through top 90 of cylindrical housing 80. Refrigerant outlet pipe 84 extends into cylindrical housing 80 to an extent below or vertically lower than the location of inlet connection 92, and refrigerant outlet pipe 84 is substantially parallel with cylindrical housing 80 along a central axis 94 thereof. Cylindrical housing 80 hermetically seals off the inside of oil separator 46. The components of the oil separator may be made of steel or other suitable material with the peripheral wall having a suitable thickness that may vary to meet noise tolerances and pressure rating of the oil separator 46.

Figure 5:
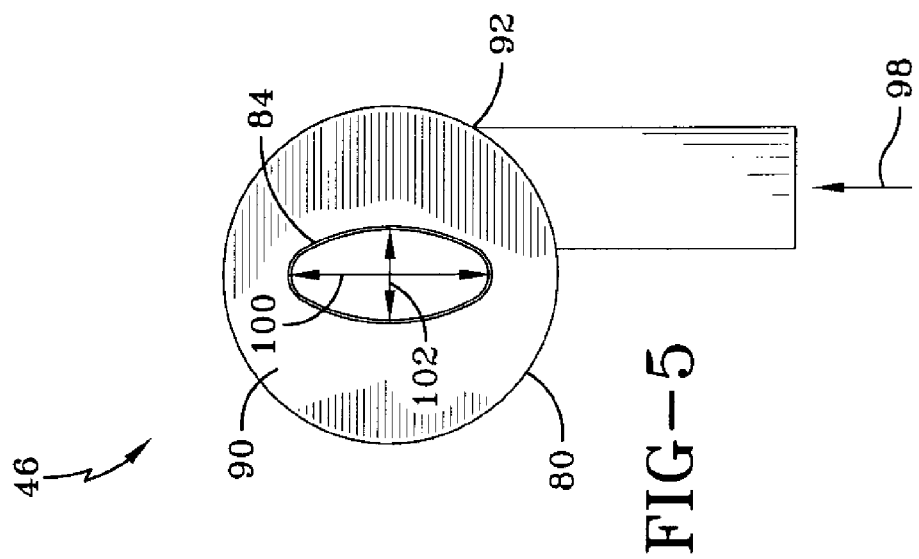
FIG. 5 is a schematic illustration of a top view of an exemplary oil separator.

An inlet connection 92 is disposed in upper section or portion 88 of cylindrical housing 80, and is disposed tangentially to cylindrical housing 80 so that a flow path 98 that refrigerant gas 86 follows induces a swirling motion in the refrigerant gas 86. In one embodiment, upper portion 88 includes top 90. As illustrated in FIG. 5, inlet connection 92 is oriented such that fluid entering cylindrical housing 80, that is, refrigerant vapor containing entrained oil, is tangentially directed toward minor axis 102 (that is, parallel to major axis 100) of non-circular refrigerant outlet pipe 84. By tangentially directing fluid toward minor axis 102 of refrigerant outlet pipe 84, flow losses of entering fluid and pressure drop in cylindrical housing 80 can be both minimized. Non-circular refrigerant outlet pipe 84 reduces pressure drop by reducing unnecessary entrance losses near entrance 104 (FIG. 4) to refrigerant outlet pipe 84. In addition, the use of a non-circular refrigerant outlet pipe 84 smoothes the transition from a linear flow from inlet connection 92 to a swirling (e.g., circular) flow within cylindrical housing 80. By directing flow towards the minor axis of a non-circular outlet pipe, the inlet losses are minimized.

Figure 4:
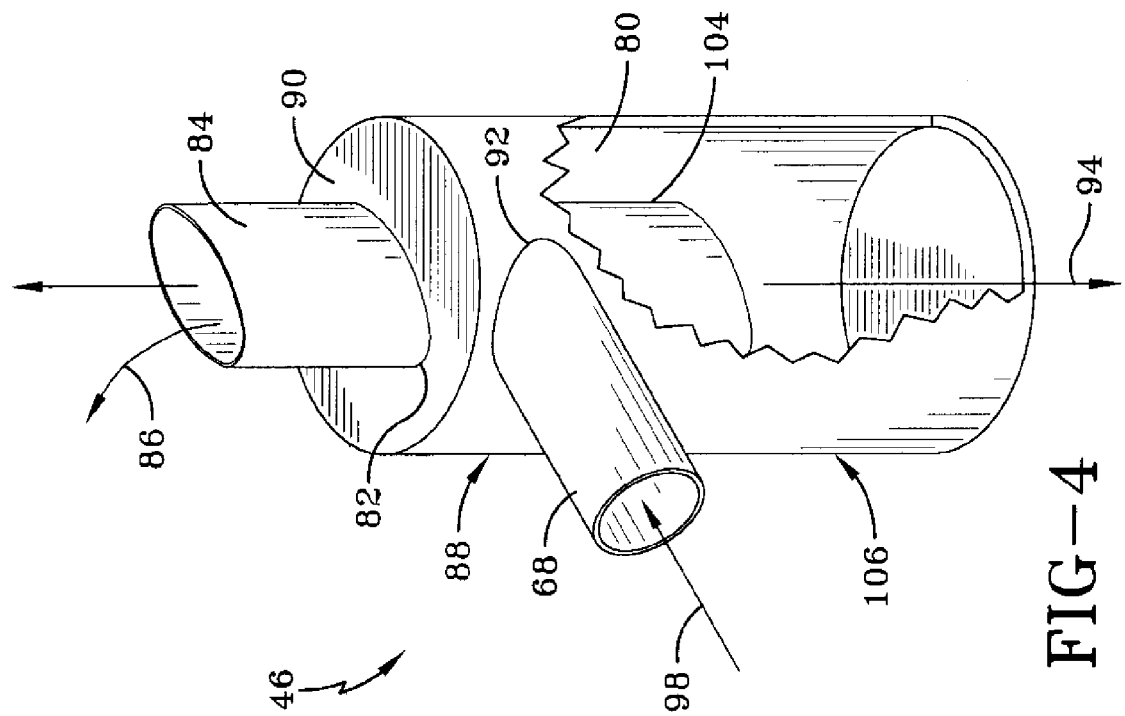
FIG. 4 is a schematic illustration of a perspective view of an exemplary oil separator.

If two refrigerant outlet pipes are desired in cylindrical housing 80, the elliptical shape may be obtained by connecting flat or curved plates between two circular outlet pipes 105 mounted in parallel as shown in FIG. 4. Similarly, if more than two outlet pipes are required, plates can be connected between circular pipes 105 to form the elliptical or non-circular shape. Elliptical outlet pipe 84 may be formed from two or more circular pipes 105 and corresponding plates that are joined together by any suitable technique, such as by welding. Accordingly, outlet pipe 84 has a cross-section approximating an ellipse, and it provides for splitting the flow into two or more streams.

Figure 7:
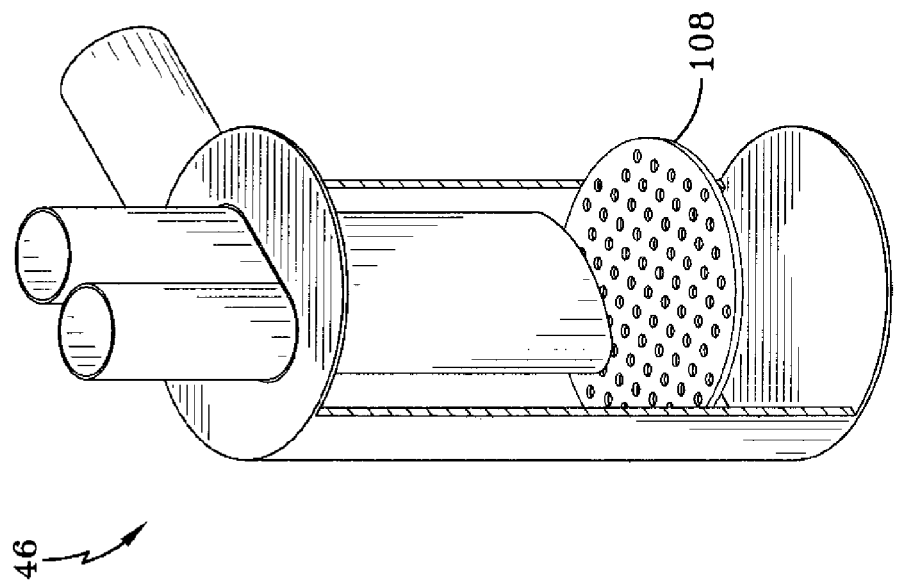
FIG. 7 is a schematic illustration of a cut-away view of an exemplary oil separator.

The bottom portion of cylindrical housing 80 includes an oil reservoir 106 where separated oil is collected. An oil outlet (not shown) or drain is located in oil reservoir 106 or sump at the bottom of cylindrical housing 80 to return collected oil to a chiller system. Baffle 108, depicted in FIG. 7 as a perforated disk, may also be used to separate oil reservoir 106 from the upper centrifugal separation section 88 of cylindrical housing 80.

During operation, an oil and gas mixture from a compressor is introduced into upper centrifugal separation section 88 of cylindrical housing 80 by swirling in a counter-clockwise direction due to the tangential placement of inlet connection 92 to cylindrical housing 80. In an alternate embodiment swirling motion of the gas flow path 98 may be directed in a clockwise direction when the inlet connection 92 is repositioned. Swirling flow path 98 of the oil and gas mixture separates the oil from the mixture in upper centrifugal separation section 88.

Oil has a greater density than the refrigerant gas. Thus, the swirling motion of the oil and gas mixture causes the oil to move radially outwardly to the peripheral wall by centrifugal force and to adhere to the peripheral wall by surface tension. The oil adhered to the peripheral wall then drops down by the gravity and is accumulated in oil reservoir 106. The oil separator 46 may also include a screen or mesh member (not shown) at the inner surface of the peripheral wall to facilitate adhesion of the oil.

As the oil and gas mixture travels from upper centrifugal separation section 88 toward the bottom of oil reservoir 106, flow path 98 of the mixture is forced to change direction. The oil and gas mixture abruptly changes its flow direction, that is, the downward to upward direction. This abrupt change in flow path 98 subjects the oil remaining in the oil and gas mixture to a further separation process. The oil cannot completely overcome its downward momentum and fine oil droplets continue to travel into oil reservoir 106. As a result, the oil that cannot overcome the downward momentum drops down to oil reservoir 106. Moreover, some oil droplets that travel upwardly may not have enough momentum to resist the gravitational force and consequently drop into to the oil reservoir 106.

Oil reservoir 106 is disposed within the housing and in fluid communication with an oil outlet (not shown). Oil separator 46 may also include a perforated oil drainer that separates oil reservoir 106, or upper portion 88 and lower portion 106 may be separated by a baffle (not shown). Oil that accumulates in oil reservoir 106 is discharged from the housing through oil outlet (not shown) and returned to the compressor via a main oil return line 110 (see FIG. 3). Due to high pressure in oil separator 46, oil in oil reservoir 106 is automatically discharged outside of oil separator 46.

Also provided is a method for separating oil from an oil and gas mixture in a chiller system. An example method includes tangentially introducing an oil and gas mixture into a cylindrical housing 80, separating oil from the mixture by centrifugal force, separating oil from the mixture by changing a flow direction of the mixture in cylindrical housing 80, discharging gas 86 from cylindrical housing 80, and discharging oil separated from the oil and gas mixture from cylindrical housing 80.

While only certain features and embodiments of the invention have been illustrated and described, many modifications and changes may occur to those skilled in the art (for example, variations in sizes, dimensions, structures, shapes and proportions of the various elements, values of parameters (for example, temperatures, pressures, and other parameters), mounting arrangements, use of materials, colors, orientations, and other variations) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (that is, those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. An oil separator for separating oil from a compressed gas and oil mixture, the oil separator comprising:
    a cylindrical housing comprising a first portion, a second portion disposed below the first portion, at least one inlet connection configured to receive the compressed gas and oil mixture, and at least one outlet connection configured to discharge a compressed gas with substantially all of the oil removed;
    the at least one outlet connection in fluid communication with a non-circular outlet external pipe, the outlet external pipe extending from within the first portion and passing through the first portion, the outlet external pipe extending into the cylindrical housing below the inlet connection;
    the inlet connection disposed in of the first portion approximately tangent to an inner wall of the cylindrical housing;
    the inlet connection in fluid communication with a discharge line of a compressor, the inlet connection configured to direct fluid tangentially in the cylindrical housing toward a first axis of the non-circular outlet external pipe; and
    the second portion comprising an oil reservoir configured to contain the separated oil from the gas and oil mixture.

2. The oil separator of claim 1, further comprising an oil outlet disposed in the oil reservoir adjacent the second portion opposite the first portion of the cylindrical housing, the oil outlet configured to discharge the separated oil to the compressor.

3. The oil separator of claim 1, further comprising a baffle portion disposed between the first portion and the second portion, the baffle portion including apertures to separate the second portion from the first portion.

4. The oil separator of claim 1, further comprising a perforated oil drainer that separates the oil reservoir from the first portion.

5. The oil separator of claim 2, wherein the oil reservoir is disposed within the housing in fluid communication with the oil outlet, and wherein oil in oil reservoir is automatically discharged from the oil separator to the compressor in response to a pressure increase in the separator.

6. The oil separator of claim 1, wherein the non-circular outlet external pipe is arranged to smooth a transition from a substantially linear flow at the inlet connection to a swirling flow within the cylindrical housing.

7. The oil separator of claim 1, wherein the at least one non-circular outlet external pipe comprises a pair of refrigerant pipes mounted in parallel, wherein an elliptical configuration is obtained by connecting at least one plate between the pair of circular outlet pipes.

8. The oil separator of claim 1, wherein the non-circular outlet external pipe comprises at least three outlet pipes, a plurality of plates connected between the outlet pipes to form a noncircular outlet.

9. The oil separator of claim 1, wherein the non-circular outlet external pipe comprises a cross section that is substantially elliptical, and the outlet external pipe divides the flow into a plurality of streams.

10. The oil separator or claim 1, wherein during operation, the oil and gas mixture is introduced into the first portion of the cylindrical housing by swirling in a clockwise or a counterclockwise direction due to a tangential placement of inlet connection.

11. The oil separator of claim 1, the first portion further comprising a top portion, and the outlet pipe extending from within the first portion and through the top portion.

12. A chiller system comprising:
    a compressor, a condenser and an evaporator connected in a closed refrigerant loop; and
    an oil separator having an inlet connection III fluid communication with a discharge line of the compressor and an outlet connection in fluid communication with the condenser, the oil separator comprising:
        a cylindrical housing comprising a first portion, a second portion disposed below the first portion, at least one inlet connection configured to receive the compressed gas and oil mixture, and at least one outlet connection configured to discharge a compressed gas with substantially all of the oil removed;
        the at least one outlet connection in fluid communication with a noncircular outlet external pipe, the outlet external pipe extending from within the first portion and passing through the first portion, the outlet external pipe extending into the cylindrical housing below the inlet connection;
        the inlet connection disposed in the first portion approximately tangent to an inner wall of the cylindrical housing;
        the inlet connection in fluid communication with a discharge of a compressor, the inlet connection configured to direct fluid tangentially in the cylindrical housing toward a first axis of the non-circular outlet external pipe; and the second portion comprising an oil reservoir configured to contain the separated oil from the gas and oil mixture.

13. The oil separator of claim 12, further comprising an oil outlet disposed in the oil reservoir adjacent the second portion opposite the first portion of the cylindrical housing, the oil outlet configured to discharge the separated oil to the compressor.

14. The oil separator of claim 12, further comprising a baffle portion disposed between the first portion and the second portion, the baffle portion including apertures to separate the second portion from the first portion.

15. The oil separator of claim 12, further comprising a perforated oil drainer that separates the oil reservoir from the first portion.

16. The oil separator of claim 13, wherein the oil reservoir is disposed within the housing in fluid communication with the oil outlet, and wherein oil in oil reservoir is automatically discharged from the oil separator to the compressor in response to a pressure increase in the separator.

17. The oil separator of claim 12, wherein the non-circular outlet external pipe is arranged to smooth a transition from a substantially linear flow at the inlet connection to a swirling flow within the cylindrical housing.

18. The oil separator of claim 12, wherein the at least one non-circular outlet external pipe comprises a pair of refrigerant pipes mounted in parallel, wherein an elliptical configuration is obtained by connecting at least one plate between the pair of circular outlet pipes.

19. The oil separator of claim 12, wherein the non-circular outlet external pipe comprises at least three outlet pipes, a plurality of plate connected between the outlet pipes to form a noncircular outlet.

20. The oil separator of claim 12, wherein the non-circular outlet external pipe comprises a cross-section that is substantially elliptical, and the outlet external pipe divides the flow into a plurality of streams.

21. The chiller system of claim 12, wherein the oil separator further comprises a mesh member covering an inner surface of a peripheral wall of the cylindrical housing to increase adhesion of the oil.

22. The chiller system of claim 12, wherein the outlet external pipe is arranged substantially in parallel with a major axis of the cylindrical housing, wherein the cylindrical housing is configured with an elliptical cross section.

* * * * *